United States Patent Office 3,101,072
Patented Aug. 20, 1963

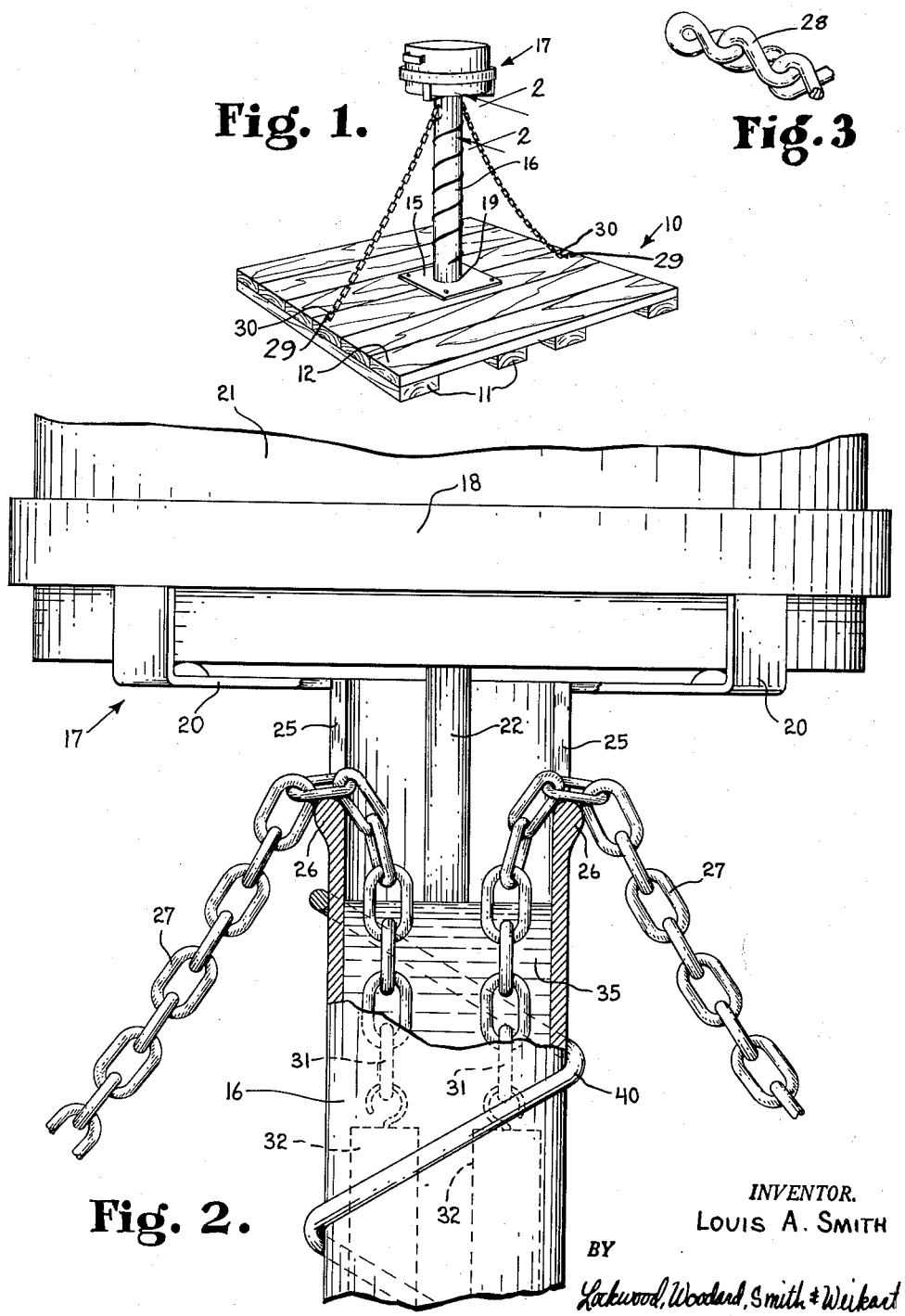

3,101,072
HOG OILER
Louis A. Smith, R.R. 1, Denver, Ind.
Filed Apr. 10, 1961, Ser. No. 101,952
4 Claims. (Cl. 119—157)

This invention relates to an apparatus for the rubbing, treating and oiling of animals and particularly hogs, the rubbing being accomplished by the hogs themselves.

It is known in the art to provide a station or apparatus set up in a suitable location so that hogs may rub thereagainst to scratch themselves and to coat or impregnate their skin or hides with a liquid oil, insecticide or the like. It has been found that presently available apparatus of this nature have a number of imperfections which prevent them from performing their intended function in the most facile and efficient manner. For this reason, it is a general and primary object of the present invention to provide an improved apparatus for the rubbing, treating and oiling of animals such as hogs.

A further object of the present invention is to provide an apparatus for rubbing and oiling of animals which apparatus is relatively simple and inexpensive to manufacture, yet is capable of performing its desired function in an efficient manner.

Still another object of the present invention is to provide a device of the present character which maintains constant the rate of delivery of the oil to the animal's coat no matter how recently oil has been added to the apparatus.

Still another object of the present invention is to provide an apparatus of the present nature incorporating an improved rigid means against which an animal can scratch himself, said rigid means incorporating improved structure for spreading oil over the surface thereof.

Related objects and advantages will become apparent as the description proceeds.

One embodiment of the present invention includes a horizontally extending base, a support extending upwardly from said base, said support acting as an oil reservoir, means for maintaining the oil within said reservoir at a constant level, an elongated flexible element secured at one end to said base, a weight secured to the other end of said flexible element and hanging thereon in said reservoir, said elongated element being sufficiently long that its other end is submerged within the oil in said reservoir whereby an animal rubbing or forcing against said flexible element tends to draw the other end of the flexible element upwardly and to cause oil to run down the flexible element from the other end thereof toward the base.

The full nature of the invention will be understood from the accompanying drawings and the following description and claims.

FIG. 1 is a perspective view of a hog oiler constructed according to the present invention.

FIG. 2 is a vertical section through the hog oiler of FIG. 1.

FIG. 3 is a fragmentary perspective view of a further embodiment of the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a hog oiler including a base 10 made up of lumber such as, for example, 2 x 4's as bracing elements 11 and 1 x 6's for the flooring 12. Secured centrally to this base 10 is a plate 15 having an upright pipe 16 (such as, for example, a three inch diameter pipe) suitably secured thereto as by welding 19 or the like. Secured to the upper end of the pipe 16 is a rack or retainer 17 including an annular ring 18 and radially and vertically extending elements 20 securing the ring to the support. The rack 17 receives a generally cyclindrically shaped tank 21 having a spout 22 secured thereto and forming the only exit for the tank. It should be mentioned that the spout 22 may be threadedly received within the tank so as to be removable therefrom, if desired, to facilitate placing oil within the tank.

The pipe 16 is sealed to the plate 15 and forms therewith a container or reservoir for oil which is maintained at a constant level by reason of the fact that there is no other exit to the tank 21 than the spout 22. Thus, whenever the oil level within the support moves downwardly away from the lower end of the spout 22, more oil flows into the support and brings the level back up to the spout.

Formed at the upper end portion of the support 16 are a pair of slots 25 terminated at their lower ends by means of thickened portions 26 which act as bearings across which are moved chains 27. The chains 27 are illustrated as straight link chains for the purpose of ease of illustration. Such a straight link chain is very definitely workable in the present invention; however, a twist link machine chain as is fragmentarily shown at 28 in FIG. 3 is preferred for the reason that the oil flows more easily therealong. The chains are secured at their lowermost and outermost links 30 to the base 10 by suitable bolts 29 and extend upwardly and inwardly to the support through the slots 25 and hang downwardly in the support. Secured to each of the endward links 31 within the support is a weight 32 which normally retains the endward portion of the chain within the support and normally submerged within the oil 35 in the support. When an animal moves against either of the chains 27, the submerged portion of the chain is drawn upwardly and out of the support to a position above the remainder of the chain thus causing the oil carried with and temporarily adhering to this formerly submerged portion to run downwardly onto the remainder of the chain.

Thus, as the hog or other animal rubs against the chains, its skin or hide is coated or impregnated with oil. When the animal moves away from the chains 27, the weights 32 again return them to the illustrated position. It should be noted that the amount of oil delivered to the chains 27 is controlled or adjusted by securing different links (near the link 30) to the base by the bolts mentioned above. Thus, less of the chain is dipped in the oil. It should also be noted that the weights 32 are somewhat larger than slots 25 and therefore, cannot be pulled therethrough by the hog.

Secured to the outside of support 16 is a helical element 40 which is fixed to the support at the upper end of the helical element and also at the lower end thereof. It should be emphasized that the various convolutions of this helical element are spaced from one another and thus, any oil flowing downwardly on the outside of the support will be permitted to flow a substantial distance vertically but will also be provided with a rotating motion causing the complete outer surface of the support to be covered with oil. Obviously, this oil will be supplied to the outer surface of the support by reason of spillage occurring each time one or both of the chains are withdrawn from the support. It should be noted that the support 16 is rigid in nature and will not given or yield when the hog moves thereagainst.

From the above description, it will be evident that the present invention provides an improved device for rubbing, treating and oiling of animals and particularly hogs. It will be obvious from the above description that the present device is simple and inexpensive to manufacture, yet is durable and capable of doing the job required in an efficient manner.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Animal rubbing apparatus comprising a horizontally extending base, a support extending upwardly from said base and acting as an oil reservoir, means for maintaining the oil within said reservoir at a constant level, a chain secured adjacent one end to said base, a weight secured to the other end of said chain and hanging thereon in said reservoir, said chain being sufficiently long that its other end is submerged within the oil in said reservoir whereby an animal rubbing or forcing against said chain tends to draw the other end of the chain upwardly and to cause the oil about the other end of the chain to run down the chain toward the base, said support having slots formed therein through which said chains extend, said slots terminating at their lower ends in thickened bearing portions upon which said chains bear, and a helical element secured to the outside of said support, the adjacent convolutions of said helical element being spaced from one another to spread oil over the surface of said support.

2. Animal rubbing apparatus comprising a horizontally extending base, a support extending upwardly from said base, said support acting as an oil reservoir, a tank carried by said support, said tank having a spout opening downwardly of the tank into the reservoir, said spout being the only exit of the tank, an elongated flexible element secured at one end portion to said base, a weight secured to the other end portion of said flexible element and hanging thereon in said reservoir, said elongated element being sufficiently long that its other end portion is submerged within the oil in said reservoir whereby an animal rubbing or forcing against said flexible element tends to draw the other end portion of the flexible element upwardly and to cause oil to run down the flexible element from the other end thereof toward the base, said support having slots formed therein through which said elements extend, said slots terminating at their lower ends in thickened bearing portions upon which said elements bear.

3. Animal rubbing apparatus comprising a horizontally extending base, a support extending upwardly from said base and acting as an oil reservoir, an elongated flexible element secured at one end to said base, a weight secured to the other end of said flexible element and hanging thereon in said reservoir, said elongated element being sufficiently long that its other end is submerged within the oil in said reservoir whereby an animal rubbing or forcing against said flexible element tends to draw the other end of the flexible element upwardly and to cause oil to run down the flexible element from the other end thereof toward the base, said support having openings formed therein and having bearing portions defining the lower edges of said openings, said flexible elements extending through said openings and resting and riding on said bearing portions.

4. Animal rubbing apparatus comprising a horizontally extending base, a support extending upwardly from said base and carrying a liquid supply, an elongated flexible element secured to said base, a weight secured to the flexible element and hanging thereon in said support, said elongated element being sufficiently long that a portion thereof is submerged within the liquid in said support, said support having openings formed therein and having bearing portions defining the lower edges of said openings, said flexible elements extending through said openings and resting and riding on said bearing portions.

References Cited in the file of this patent
UNITED STATES PATENTS

| | | |
|---|---|---|
| 1,301,904 | Burrell | Apr. 29, 1919 |
| 2,581,028 | Kirk | Jan. 1, 1952 |
| 2,688,950 | McKinley | Sept. 14, 1954 |
| 2,982,251 | Krogman | May 2, 1961 |
| 2,988,051 | Minock | June 13, 1961 |